United States Patent Office 2,856,405
Patented Oct. 14, 1958

2,856,405
MECURATION PRODUCTS OF 1-(2-PYRIMIDYL)-3-ALLYLUREA

John H. Biel, Milwaukee, Wis., assignor to Lakeside Laboratories, Inc., a corporation of Wisconsin No Drawing. Application June 4, 1956
Serial No. 588,997

7 Claims. (Cl. 260—242)

This invention relates to novel chemical compounds and processes of preparing the same. More particularly, this invention relates to novel derivatives of allylurea and mercuration products of such derivatives.

There are provided according to the present invention novel ultimate compounds of the formula

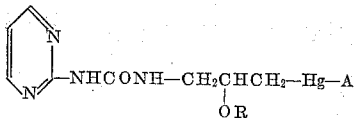

and salts thereof, wherein R is hydrogen or a lower alkyl group and A is acyloxy, halogen, hydroxyl, a residue of an acidic nitrogen compound from which a hydrogen has been displaced so that the nitrogen from which the hydrogen has been removed is bonded directly to the mercury atom, or an —S—R' group in which R' is a monocarboxy substituted lower alkyl group, a polycarboxy substituted lower alkyl group, a monocarboxy substituted aromatic group, a polycarboxy substituted aromatic group, a lower monohydric alcohol group, and a lower polyhydric alcohol group, and salts thereof, as well as intermediate compounds useful in the production thereof.

The starting materials from which these compounds are formed are 2-aminopyrimidine and allylisocyanate. When these reactants are contacted in an inert solvent such as benzene or hexane, preferably at an elevated temperature such as the reflux temperature, there is formed 1-(2-pyrimidyl)-3-allylurea of the formula

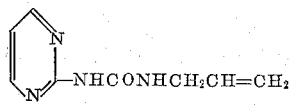

This intermediate compound may be recovered from the reaction mixture and purified by conventional methods or the mixture may be used directly in the following step.

1-(2-pyrimidyl)-3-allylurea is subsequently reacted with a mercury salt of a monocarboxylic acid of more than one carbon and less than six carbons in the presence of a lower alcohol or water. A 1-(2-pyrimidyl)-3-(β-hydroxy or alkoxy-γ-acyloxymercuri propyl)-urea appears to form as an intermediate in the reaction and to be converted in situ quickly to an internal salt. This reaction may be represented as follows:

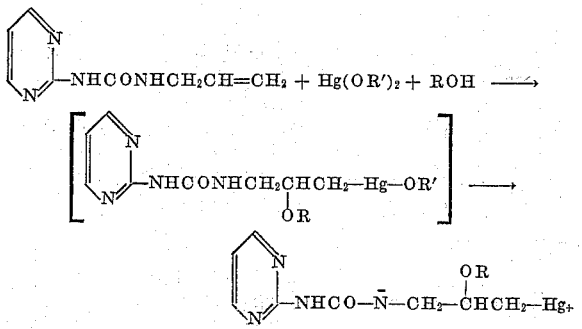

wherein R is hydrogen or a lower alkyl group and R' is an acyl group from a monocarboxylic acid of more than one carbon and less than six carbons.

The reaction may be conveniently effected by intimately mixing the reactants and heating the mixture, such as at the reflux temperature, for about 1 to 10 hours. After the reaction is terminated the reaction product may be recovered by conventional procedures.

When water is used in the reaction a β-hydroxyl group will be introduced in the propyl moiety of the product; an alkoxy group is introduced with lower alcohols, such as methanol, ethanol, propanol, butanol and the like. Typical compounds which may be produced are 1-(2-pyrimidyl)-3-(β-hydroxy-γ-mercuri propyl)-urea, 1-(2-pyrimidyl)-3-(β-methoxy-γ-mercuri propyl)-urea, and 1-(2-pyrimidyl)-3-(β-ethoxy-γ-mercuri propyl)-urea.

Halomercuri and hydroxymercuri compounds are conveniently formed by contacting the reaction product of the previous reaction with an alkali metal halide, preferably a chloride or bromide, or with an alkali metal hydroxide respectively. Lower alcohols or water may be used for the reaction and the product may be readily recovered. In this way such compounds as 1-(2-pyrimidyl)-3-(β-hydroxy-γ-chloromercuri propyl)-urea, 1-(2-pyrimidyl)-3-(β-methoxy-γ-bromomercuri propyl)-urea and 1-(2-pyrimidyl)-3-(β-hydroxy - γ - hydroxymercuri propyl)-urea may be formed.

A halomercuri or hydroxymercuri having a β-hydroxy or β-alkoxy group, or a 1-(2-pyrimidyl)-3-(β-hydroxy or lower alkoxy-γ-mercuri propyl)-urea, may be reacted with an acidic nitrogen compound having a replaceable hydrogen on a nitrogen such as theobromine, theophylline, succinimide and phthalimide to form compounds in which the residue remaining after removal of the hydrogen is bonded through the nitrogen atom directly to the mercury atom. The reaction may be achieved in water, or in a lower alcohol, preferably heated; upon cooling, the products generally precipitate and may be recovered by filtration.

The halomercuri and hydroxymercuri compounds having a β-hydroxy or β-lower alkoxy group, and the 1-(2-pyrimidyl)-3-(β-hydroxy or lower alkoxy-γ-mercuri propyl)-ureas, may also be reacted with a mercapto acid or mercapto alcohol to form derivatives in which the sulfur atom is bonded directly to the mercury atom. Lower mercapto monocarboxylic acids, lower mercapto polycarboxylic acids, aromatic mercapto monocarboxylic and polycarboxylic acids, preferably in which phenyl is the aromatic group, and lower mercapto mono and poly hydroxy alcohols may be reacted with the mercury compounds. Specific compounds which may be produced may have the formula

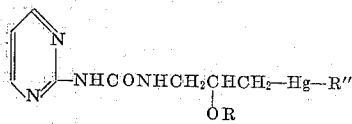

wherein R is hydrogen or a lower alkyl group and R'' is a group such as:

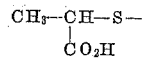

1-carboxyethylmercapto

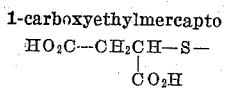

1,2-dicarboxyethylmercapto

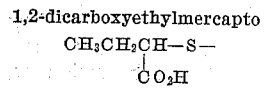

1-carboxypropylmercapto
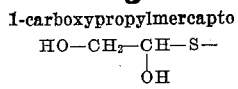

1,2-dihydroxyethylmercapto
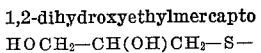

2,3-dihydroxypropylmercapto
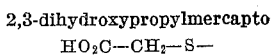

carboxymethylmercapto
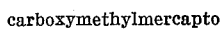

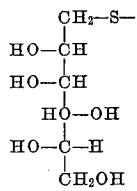

1-thiosoribtyl

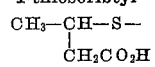

1-carboxymethyl-ethyl-mercapto
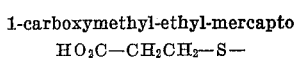

2-carboxyethylmercapto
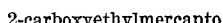

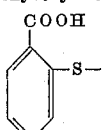

2-mercaptobenzoic acid
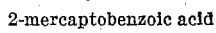

Dilute aqueous or alcoholic sodium hydroxide may be used as the reaction medium for the mercapto acids. The reaction proceeds quickly at room temperature and is often completed in a matter of minutes. Higher temperatures, such as up to the reflux temperature, may be employed, however, to enhance reaction of the slowly-reactive mercapto acids. Following termination of the reaction, the mixture is usually filtered. The basic reaction mixture gives salts of the reaction product. Upon neutralization of the mixture the free acid is formed and precipitates. It is conveniently recovered and purified by conventional procedures.

Although the mercapto alcohols may also be reacted in aqueous sodium hydroxide with the mercuri compound, it is often better to employ an organic solvent such as a lower alcohol or other suitable solvent, in the absence of the base. From room to reflux temperatures may be employed according to the reactivity of particular reactants. The desired product may precipitate from the reaction mixture and can, therefore, be recovered by filtration; otherwise it may be recovered by evaporating the mixture to dryness or other common procedures.

Approximately equimolar ratios of reactants are preferred although other ratios may also be used.

These mercapto mercuri compounds form salts. Those compounds having carboxy groups form alkali metal salts, such as sodium and potassium salts, readily upon contacting the acid and base in water. Ammonium salts are similarly prepared by the use of ammonium hydroxide. Salts are also formed with amines such as procaine, choline and the like.

The non-toxic compounds provided by this invention are potent diuretic agents and are therefore useful in the treatment of congestive heart failure. Administration may be effected orally or parenterally, the latter either intramuscularly or subcutaneously. Dosage unit forms such as tablets, capsules and solutions may be formulated for the intended route of administration.

The following examples illustrate specific embodiments of the invention. It is to be understood, however, that these examples are not to be construed as limiting the scope of the invention.

*Example 1*

1-(2-pyrimidyl)-3-allylurea:

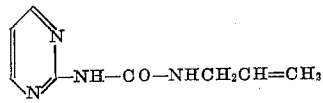

To 28.5 g. (0.30 mole) of 2-aminopyrimidine in 300 cc. of benzene was added 24.9 g. (0.30 mole) of allylisocyanate and the mixture stirred and refluxed for three hours. The solution was clarified by filtration. The filtrate was concentrated in vacuo and the oily residue dissolved in 200 cc. of hot water containing a few drops of ethyl alcohol to effect solution. The product was collected by filtration, yield 24.7 g. (46%), M. P. 99–101° C.

*Analysis.*—Calcd. for $C_8H_{10}N_4O$: N, 31.46. Found: N, 30.73.

*Example 2*

1-(2-pyrimidyl)-3-(β-methoxy-γ-mercuri-propyl)-urea:

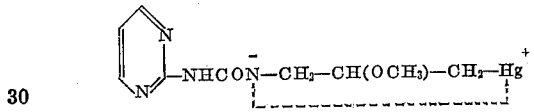

To 18.6 g. (0.10 mole) of 1-(2-pyrimidyl)-3-allylurea dissolved in 300 cc. of methanol was added 31.9 g. (0.10 mole) of mercuric acetate and 24.6 g. of glacial acetic acid. The solution was refluxed with stirring for 8 hours and then allowed to stand at room temperature overnight. The precipitate was collected by filtration, yield 29 g., M. P. 213° C. dec.

*Analysis.*—Calcd. for $C_{11}H_{16}HgN_4O_4$: Hg, 49.1; N, 13.69. Found: Hg, 48.4; N, 13.30.

*Example 3*

1 - (2 - pyrimidyl) - 3 - (β - methoxy-γ-carboxy-methyl-mercaptomercuri-propyl)-urea:

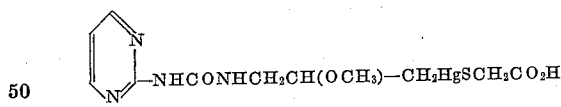

To 4.1 g. (0.01 mole) of the mercury derivative from Example 2 suspended in 25 cc. of methanol was added 1.5 g. (0.016 mole) of thioglycolic acid. The precipitate was collected by filtration, M. P. 145° C. dec.

*Example 4*

1 - (2 - pyrimidyl) - 3 - [β - methoxy - γ - (1 - carboxy-ethylmercapto)-mercuri-propyl]-urea:

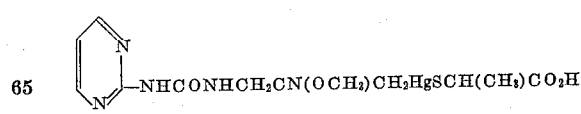

To 4.1 g. (0.01 mole) of the mercury compound of Example 2 suspended in 25 cc. of ethanol was added 1.6 g. (0.015 mole) of thiolactic acid in 5 cc. of ethanol. The solid was collected by filtration, suspended in hot ethanol, and the insoluble material separated, yield 1.5 g., M. P. 127° C.

*Analysis.*—Calcd. for $C_{12}H_{18}HgN_4O_4S$: Hg, 38.9; N, 10.88; S, 6.22. Found: Hg, 38.0; N, 10.63; S, 6.28.

What is claimed is:

1. A member of the group consisting of compounds of the formulae:

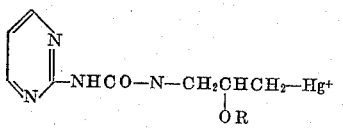

and

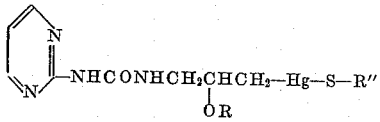

and nontoxic salts thereof, wherein R is a member of the group consisting of hydrogen and lower alkyl groups, and R" is a monocarboxy substituted lower alkyl group.

2. 1-(2-pyrimidyl)-3-allylurea.
3. 1 - (2 - pyrimidyl)-3-($\beta$-methoxy-$\gamma$-mercuri propyl)-urea.
4. 1 - (2 - pyrimidyl)-3-($\beta$-methoxy-$\gamma$-carboxymethyl-mercaptomercuri propyl)-urea.
5. 1 - (2 - pyrimidyl)-3-[$\beta$-methoxy-$\gamma$-(1-carboxyethyl-mercapto)-mercuri propyl]-urea.
6. 1-(2-pyrimidyl)-3-($\beta$-lower alkoxy-$\gamma$-mercuri propyl)-urea.
7. 1 - (2 - pyrimidyl)-3-($\beta$-hydroxy-$\gamma$-mercuri propyl)-urea.

References Cited in the file of this patent

UNITED STATES PATENTS

| | | |
|---|---|---|
| 1,948,179 | Lautenschlager et al. | Feb. 20, 1934 |
| 2,136,503 | Hartmann et al. | Nov. 15, 1938 |
| 2,635,982 | Rowland | Apr. 21, 1953 |

OTHER REFERENCES

Rowland et al.: J. Am. Chem. Soc., vol. 72–73, pp. 3595–8.

Feist et al.: Chem. Abs., vol. 28, p. 3408.

UNITED STATES PATENT OFFICE
CERTIFICATE OF CORRECTION

Patent No. 2,856,405                          October 14, 1958

John H. Biel

It is hereby certified that error appears in the printed specification of the above numbered patent requiring correction and that the said Letters Patent should read as corrected below.

Column 3, line 20, for "1-thiosoribtyl" read -- 1-thiosorbityl --; column 4, line 65, for that portion of the formula reading "-NHCONHCH$_2$CN" read -- -NHCONHCH$_2$CH --; column 6, line 19, list of references cited, under the heading "OTHER REFERENCES", for "3595-8." read -- 3595-8, (pp. 3691-3). --.

Signed and sealed this 10th day of February 1959.

(SEAL)
Attest:

KARL H. AXLINE                                    ROBERT C. WATSON
Attesting Officer                                  Commissioner of Patents